United States Patent [19]
Baum

[11] 3,974,448
[45] Aug. 10, 1976

[54] USE OF EQUALIZERS IN SATELLITE COMMUNICATION TRANSMISSION SYSTEMS

[75] Inventor: Heinz Baum, Munich, Germany

[73] Assignee: Siemens Aktiengesellschaft, Berlin & Munich, Germany

[22] Filed: Jan. 20, 1975

[21] Appl. No.: 542,573

[30] Foreign Application Priority Data
Jan. 21, 1974   Germany............................. 2402692

[52] U.S. Cl..................................... 325/1; 325/65; 325/11
[51] Int. Cl.².......................................... H04B 7/14
[58] Field of Search............................. 325/1, 3–6, 325/46, 65, 11

[56] References Cited
UNITED STATES PATENTS
3,745,464   7/1973   Lee........................................ 325/65

Primary Examiner—Benedict V. Safourek
Assistant Examiner—Jin F. Ng
Attorney, Agent, or Firm—Hill, Gross, Simpson, Van Santen, Steadman, Chiara & Simpson

[57] ABSTRACT

A satellite communication transmission system for assuring distortion free transmission of signals via satellites and wherein a single distortion compensator is utilized in an I.F. section rather than a plurality of distortion correctors in low frequency sections and wherein the distortion compensation is accomplished in the I.F. or R.F. stages.

2 Claims, 11 Drawing Figures

USE OF EQUALIZERS IN SATELLITE COMMUNICATION TRANSMISSION SYSTEMS

BACKGROUND OF THE INVENTION

1. Field of the Invention

This invention relates in general to satellite communication transmission systems and in particular to an improved distortion compensating system.

2. Description of the Prior Art

In prior art communication systems via satellites, the frequency characteristics of the satellite transponder is such that distortion of the signal occurs. Such distortion must be compensated by providing an opposite predistortion before the signal passes through the satellite transponder or alternatively by subsequently removing the distortion in the transmitter or in the receiver of the ground radio station. Generally, predistortion is used since a fewer number of distortion removing devices are required at the transmitting site than would be required at the receiving site due to the fact that there are many more receivers than there are transmitters. Until this time, it has been common to remove the distortion caused by the frequency characteristic of a satellite transponder with the use of distortion removers in the modulator frequency stage of approximately 70MHz of the transmitter at the ground radio position.

SUMMARY OF THE INVENTION

The present invention provides an improved compensating system in a satellite communication system wherein in some embodiments a single distortion remover is utilized in an I.F. section of a transmitter which eliminates the numerous distortion removers of the prior art wherein such removers were mounted in the lower frequency modulation stages of the transmitter.

Another embodiment of the invention provides for a plurality of distortion removers in the I.F. stage before the individual intelligence signals have been combined in a coupler. A third embodiment provides a single distortion corrector at the transmitter which is located in the R.F. stages of the transmitter.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 2b is a plot illustrating the three separate characteristics required for correcting for the distortion of the transponder illustrated in FIG. 2a.

DESCRIPTION OF THE PREFERRED EMBODIMENTS

Figure 1:
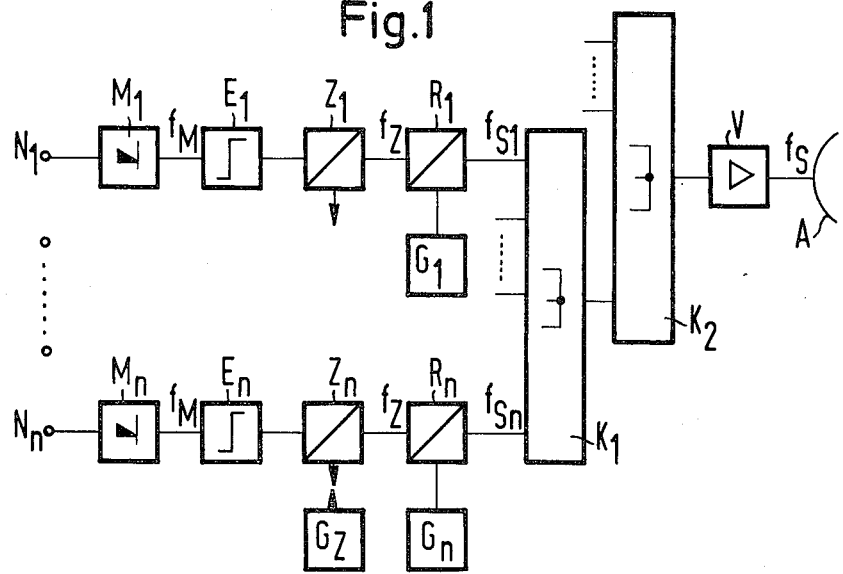
FIG. 1 is a block schematic diagram of a ground station for a satellite communication system.

FIG. 1 is a block diagram of a transmitter of a ground station in a satellite transmitting system presently being used. Such systems are described in "Nardcom Corporation-Prospect of Model GD 5000" and "GEC Marconi-Electronics Company Space Communication System Data Sheet P101". In such prior art systems, individual distortion removers each having a different characteristics are mounted in each of the communication lines in the modulator frequency stages.

As shown in FIG. 1, a plurality of input intelligent lines are designated $N_1$ through $N_n$ and are followed by a modulator $M_1$ through $M_n$. At the output of each of the modulators, distortion removers $E_1$ through $E_n$ are respectively mounted so as to provide for distortion correction in the modulator frequency stage $f_M$. Each of the distortion removers E are designed for a certain section of the transponder characteristic and thus each of the distortion removers will have a different transfer characteristic. Frequency converters $Z_1$ through $Z_n$ are respectively connected to the outputs of the distortion removers $E_1$ through $E_n$ and each of the converters receives an injection frequency from an oscillator such as oscillator $G_Z$ illustrated as providing an input to converter $Z_n$. The output of the converters Z comprises an I.F. frequency $f_Z$ and each of the signals is respectively supplied to RF converters $R_1$ through $R_n$ which receive inputs from injection oscillators $G_1$ through $G_n$ as shown. The output of the RF converters $R_1$ through $R_n$ are $f_{S1}$ through $f_{Sn}$ which form the transmission band and are supplied to a coupler $K_1$. The output of the coupler $K_1$ is supplied to a second coupler $K_2$ which also receives other inputs from other couplers which provide additional transponder bands and the combined outputs are supplied to a power amplifier V and are amplified and supplied to an antenna A at a carrier frequency $f_s$.

Figure 2A:
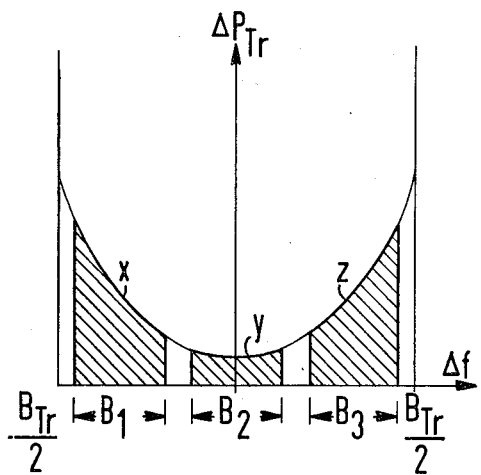
FIG. 2a is a plot of a transponder characteristic.

FIG. 2a illustrates the frequency characteristic of a transponder in a satellite over a band width of $B_{Tr}$. Generally, the phase transmit time change $\Delta P_{Tr}$ for the case of a time-dependent modulation system such as FM, PCM and PSK which is identical with the group-transmit-time change $\Delta \tau$. In the case of an amplitude, dependent modulation method, AM, the phase transit time change is identical to the amplitude-path change.

Figure 2B:
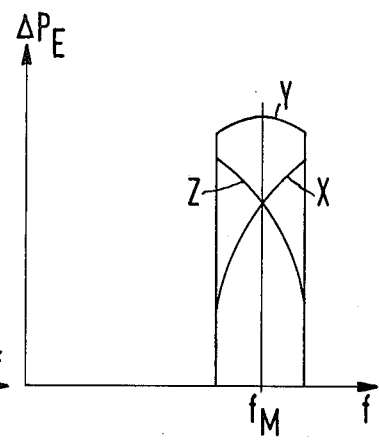

FIG. 2a illustrates three different band widths $B_1$, $B_2$ and $B_3$ which have the distortions illustrated in the ranges x, y, z of the transponder characteristic and must be respectively predistorted in the opposite manner to compensate for such distortion. Since the distortion removers of the prior art are mounted in the modulation frequency range $f_M$ and wherein the information channels are separately compensated, thus requiring three different distortion removers which have distortion removal characteristics such as illustrated in FIG. 2b. It is to be noted that the distortion removal characteristic X, Y, Z illustrated in FIG. 2b must have an opposite characteristic to the distortion of the transponder illustrated in FIG. 2a which are x, y and z. In other words, the correction characteristic X extends generally upwardly to the right in FIG. 2b wherein the transponder characteristic x in FIG. 2a extends generally downward as shown. Since the characteristic X is opposite to the characteristic x compensation will occur. The same is true for the characteristics Y-y and Z-z.

As shown in the case of transmission systems wherein several RF channels are transmitted via a transponder, individual special distortion removers having different types are thus required for each information channel. For example, in the INTELSAT-IV system for the German Federal Post Office more than 30 different types of distortion removal units are required in this system which utilizes 12 similar transponders. Although it is true that the number of the required distortion removers can be somewhat lowered when the frequency displacement from the average transponder frequency and the band widths of the information channels coincide where several applied transponders are used this condition cannot be realized in many applications. A further drawback is encountered due to the fact that in satellite communication transmission sytems frequency changes are often required and this presents a further problem wherein a large number of distortion removal types of equipment are utilized.

The present invention alows distortion removal in a communication satellite transmission system which is substantially cheaper than systems of the prior art and which provide compensation for the distortion characteristic of the transponder.

In the present invention the distortion caused by the satellite transponder in a satellite communication transmission system is accomplished at the ground station in the transmitter or receiver either before or after this distortion has occurred in the transponder and wherein at least one distortion remover which is designed for the entire transmission band width is provided and is mounted in a frequency stage of the transmitter and or receiver wherein the individual information channels have already or remained positioned in the same frequency position as at the transponder and wherein the distortion remover has a distortion removing frequency characteristic which is opposite to that of the transponder.

The invention is based on the recognition that the joint distortion removal of the information channels contained in the information band in a frequency range wherein the frequency related channel arrangement is already known and wherein the frequency characteristic of the transponder is known can be accomplished by a distortion remover which is uniformly constructed and designed to cover the entire transmission band width and thus including the entire frequency characteristic of the transponder.

It is particularly advantageous to provide one individual distortion remover which is supplied with the joint information channels which have been assembled within a transmission band. This is possible when in the case of multi-carrier operation all information channels are positioned frequency-wise adjacent to each other in the transmission band in the intermediate frequency range due to a corresponding selection of the intermediate frequency and are collected through a coupler. In such systems, only one RF converter is required for the subsequent RF conversion of all of the information channels which are positioned in the transmission band.

If it is necessary during the switching together to consider the effects of all the possible inter-modulation interference it may be necessary to utilize a special distortion remover and a RF converter for each RF channel. However, in the invention all of the distortion removers will be of the same type wherein in prior art systems the number of different type of distortion removers were required. Also, only one RF oscillator with a fixed frequency is required for the RF conversion in the present invention.

It is also a further advantage of the invention that distortion removal is possible in the transmission frequency range and this kind of distortion removal is of practical interest particularly when there are many RF channels to be transmitted by a ground station via a transponder and the combining together of the channels can only be effected after the RF conversion so as to prevent inter-modulation distortion. The distortion removal is then accomplished for all RF channels at the same time in a distortion remover in the transmission-frequency stage.

Figure 3:
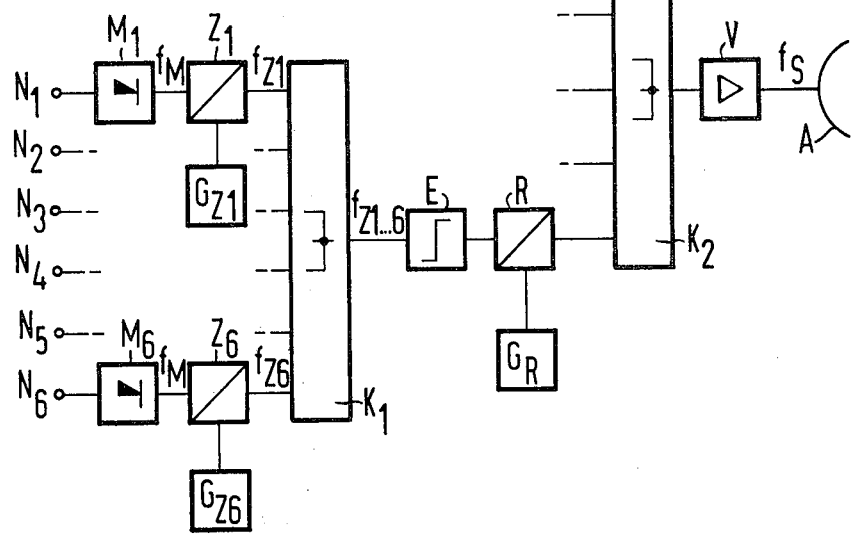
FIG. 3 is a first embodiment of a transmitter according to the invention.

FIG. 3 illustrates a ground station for a satellite transmission system according to the invention which utilizes a single distortion remover in the IF section which compensates for the distortion of all of the information channels simultaneously. Six information channels $N_1$ through $N_6$ are illustrated and respectively supply inputs to modulators $M_1$ through $M_6$. The output of the modulators are supplied to individual IF converters $Z_1$ through $Z_6$ which receive injection frequencies from oscillators $G_{Z1}$ through $G_{Z6}$. The output of the converters $Z_1$ through $Z_6$ are supplied to the coupler $K_1$ at an intermediate frequency and the output of the coupler $K_1$ passes through the distortion remover E and to an RF converter R which receives an input from an oscillator $G_R$. The output of the converter R is supplied to a second coupler $K_2$ which also receives a plurality of transmission bands as for example a total of five in the example illustrated in FIG. 5 which signals are combined and supplied to a power amplifier V at a carrier frequency $f_S$ to a antenna A.

Figure 4:
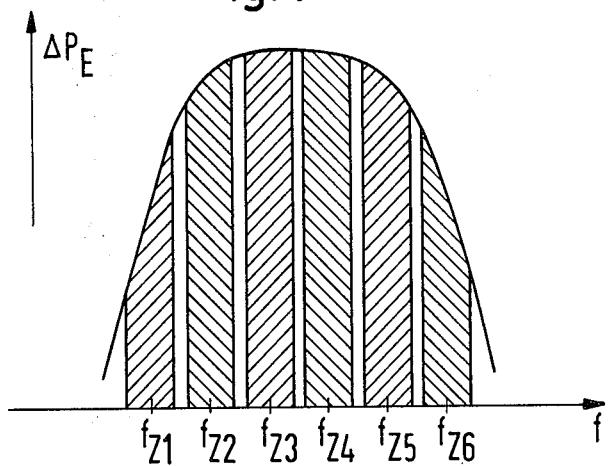
FIG. 4 is a plot illustrating the distortion removing characteristic of the embodiment illustrated in FIG. 3.

As shown in FIG. 4, the frequency characteristic of the distortion remover E of FIG. 3 pre-distorts the intermediate frequencies $f_{Z1}$ through $f_{Z6}$ in a manner which is opposite to the distortion characteristic of the satellite transponder illustrated in FIG. 2a. In other words, since the distortion remover R pre-distorts the signals $f_{Z1}$ through $f_{Z6}$ in a manner which is opposite to the distortion occurring in the transponder the received intelligence will be completely compensated for distortion by the single distortion remover E.

Figure 5:
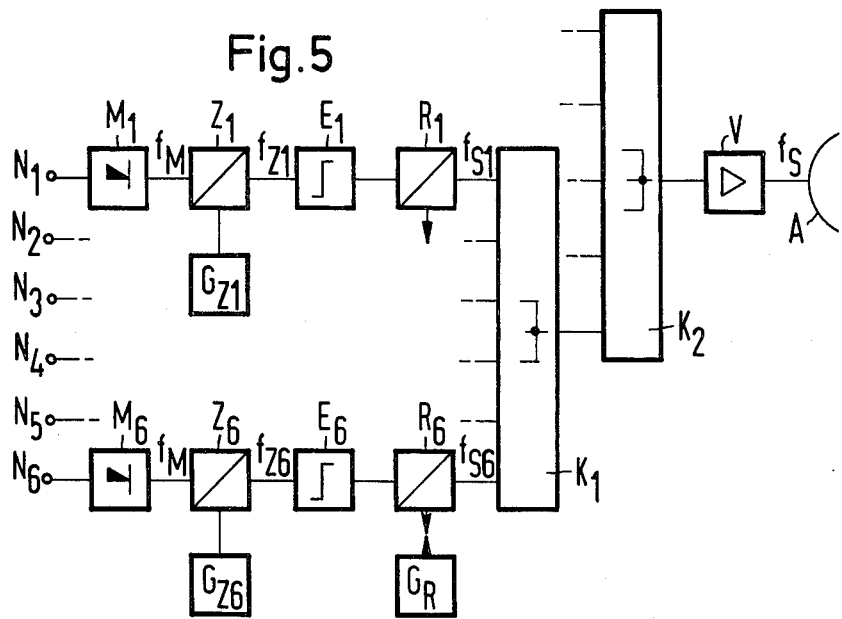
FIG. 5 is a modification of a transmitter according to the invention.

FIG. 5 illustrates another embodiment of the invention wherein a plurality of distortion removers $E_1$ through $E_6$ are respectively mounted in each of the information channels after the IF converters $Z_1$ through $Z_6$ and individual information channels $N_1$ through $N_6$ are respectively supplied to the modulators $M_1$ through $M_6$ and then to the IF converters $Z_1$ through $Z_6$ which also receive inputs from the injection oscillators $G_{Z1}$ through $G_{Z6}$. The correction removers $E_1$ through $E_6$ are respectively mounted in the IF information channels and supply outputs to radio frequency converters $R_1$ through $R_6$ which receive injection frequencies from RF oscillators $G_R$ associated therewith.

A coupler $K_1$ receives an output of the RF converters $R_1$ through $R_6$ and furnishes its output to a second coupler $K_2$ which combines signals from a number of channels and supplies it to the power amplifier V at a carrier frequency $f_S$ and to an antenna A. The difference between a system of FIG. 5 and FIG. 3 is that individual distortion removers $E_1$ through $E_6$ are required due to the combination of the information channels in the RF band for all information channels. Equal distortion removers $E_1$ through $E_6$ are used in all channels and essential advantages will result as compared with the prior art as the production of the distortion removers and the alignment such as balancing and adjustment as well as simplified maintenance of the distortion removers occurs in the system of FIG. 5.

Figure 6:
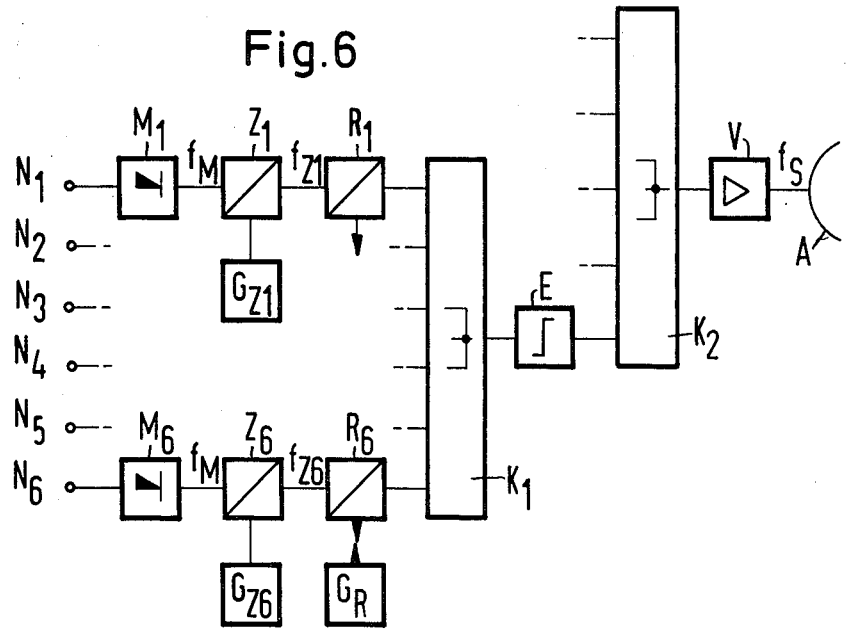
FIG. 6 illustrates a third embodiment of the invention.

FIG. 6 illustrates a further embodiment of the invention wherein distortion removal is accomplished after the combination in RF channels by a single individual distortion remover E in the transmission frequency band. In this system, the information channels are respectively supplied through the modulators $M_1$ through $M_6$ and to IF converters $Z_1$ through $Z_6$ which receive injection frequencies from the oscillators $G_{Z1}$ through $G_{Z6}$. Radio frequency converters $R_1$ through $R_6$ receive injection frequencies from oscillators $G_R$ and supply their outputs to the coupler $K_1$. The distortion remover E is connected to the output of coupler $K_1$ and supplies an input to a second coupler $K_2$. The output of the coupler $K_2$ is supplied through power amplifier V at a frequency $f_S$ to an antenna A. The distortion removal system of FIG. 6 is usually associated with relatively high cost systems and will be mainly applied when a large number of RF channels are to be transmitted via transponder to a ground radio position and when in view of inter-modulation distortion the combination of carriers must be accomplished after the RF conversion.

Figure 7A:
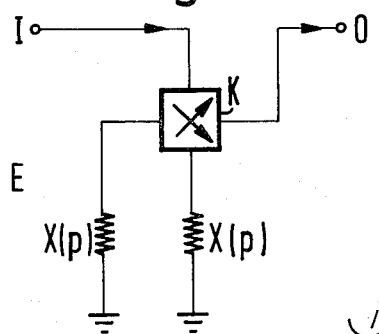
FIGS. 7a, 7b, and 7c are schematic views of the distortion removers of the present invention and, FIG. 8 illustrates the satellite communication system of the invention.
Figure 7B:
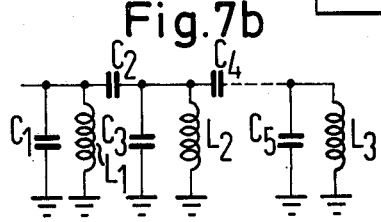

FIG. 7a illustrates a practical embodiment of a distortion remover E and comprises an input terminal I and an output terminal O which are connected to a coupler K which might be a three decibel coupler. Two equal reactants networks $X(p)$ are connected between ground and inputs to the coupler K as shown. FIG. 7b is an example of the reactant networks $X(p)$ and comprise a pair of series capacitors $C_2$ and $C_4$ with parallel capacitors $C_1$, $C_3$ and $C_5$ and parallel inductors $L_1$ and $L_3$ connected as shown. A distortion remover illustrated in FIG. 7a is primarily designed for large band widths.

Figure 7C:
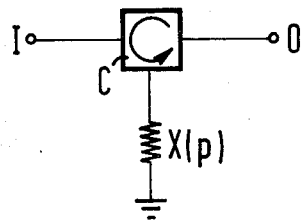

The distortion remover for small band widths is illustrated in FIG. 7c wherein a circulator C having input I and output O is provided with a reactance $X(p)$.

Figure 8:
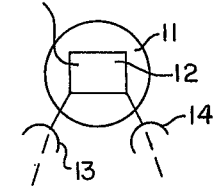

FIG. 8 illustrates the ground transmitter 10 with an antenna and a satellite 11 which carries a transponder 12 which is connected to receiving antenna 13 and transmitting antenna 14. A receiver 16 is located on the ground and has an antenna 17. It is to be realized, of course, that each of the ground stations may have a transmitter as well as a receiver and that the satellite transponder 12 may be bidirectional in that it can transmit information in either direction either from transmitter 10 to receiver 16 or alternatively from receiver 16 to transmitter 10. However, the transmitter at the location of receiver 16 is not illustrated nor the receiver at transmitter 10 since such techniques are well known to those skilled in the art.

It is seen that this invention provides new and novel apparatus for compensating for distortion occurring in satellite communication systems and although it has been described with respect to preferred embodiments it is not to be so limited as changes and modifications may be effected which are in the full intended scope as defined by the appended claims.

I claim:

1. A satellite communications transmission system having at least one satellite transponder and at least two ground radio stations between which multi-channel signals is to be transmitted at radio frequency via said transponder, said transponder having a distortion characteristic which is generally U-shaped as a function of frequency, a transmitter at one of said ground statons, a single distortion remover for compensating the entire radio frequency in said transmitter, said transmitter having a plurality of individual signals channels, means in each of said channels for converting the signal in each channel to an intermediate frequency, means combining said converted signals to a common intermediate frequency band, said distortion remover receiving the output of said combined converted common intermediate frequency band and predistorting it with a characteristic having an inverted U-shape which is opposite to the distortion characteristic of said transponder, means for converting the output of said distortion remover to a radio frequency signal and radiating it to said transponder, and means at said other ground station for receiving said radio frequency signal from said transponder and demodulating the individual signals from said radio frequency signal.

2. A satellite communications transmission system having at least one satellite transponder and at least two ground radio stations between which multi-channel signals is to be transmitted at radio frequency via said transponder, said transponder having a distortion characteristic which is generally U-shaped as a function of frequency, a transmitter at one of said ground stations, said transmitter having a plurality of individual signal channels, a plurality of frequency converters each receiving individual signals of said plurality of individual signal channels and converting each of them to intermediate frequencies, a plurality of distortion removers each having the same frequency characteristics which is inverted U-shape and opposite to the distortion characteristic of said transponder and each receiving individual signals after they have been converted to intermediate frequencies and predistorting them, means connected to the distortion remover in each channel for converting said intermediate frequencies to a radio frequency, means for combining said converted radio frequencies to a common radio frequency band and radiating it to said transponder, and means at said other ground station for receiving said radio frequency band from said transponder and demodulating the individual signals from said radio frequency band signal.

* * * * *